United States Patent
Lee et al.

(10) Patent No.: US 11,158,230 B2
(45) Date of Patent: Oct. 26, 2021

(54) METHOD FOR ADAPTIVELY CONTROLLING LOW POWER DISPLAY MODE AND ELECTRONIC DEVICE THEREOF

(71) Applicant: Samsung Electronics Co., Ltd., Gyeonggi-do (KR)

(72) Inventors: Jaeho Lee, Gyeonggi-do (KR); Minseung Kim, Gyeonggi-do (KR); Taekyoung Kim, Gyeonggi-do (KR); Jongkon Bae, Gyeonggi-do (KR); Youngil Yoon, Gyeonggi-do (KR); Yohan Lee, Gyeonggi-do (KR); Jihoon Jeon, Gyeonggi-do (KR); Hyesoon Jeong, Gyeonggi-do (KR); Yunpyo Hong, Gyeonggi-do (KR); Jongwu Baek, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/282,947

(22) Filed: Feb. 22, 2019

(65) Prior Publication Data

US 2019/0259323 A1    Aug. 22, 2019

(30) Foreign Application Priority Data

Feb. 22, 2018   (KR) .......................... 10-2018-0021149

(51) Int. Cl.
*G09G 3/20*    (2006.01)
*G09G 3/3208*    (2016.01)
(Continued)

(52) U.S. Cl.
CPC ......... *G09G 3/2003* (2013.01); *G09G 3/3208* (2013.01); *G06F 3/04847* (2013.01);
(Continued)

(58) Field of Classification Search
CPC .. G06F 1/3262; G06F 1/3265; G06F 3/04847; G06F 3/04886;
(Continued)

(56) References Cited

U.S. PATENT DOCUMENTS 10,209,766 B2    2/2019  Han et al.
10,748,504 B2    8/2020  Deng
(Continued)

FOREIGN PATENT DOCUMENTS

CN    104699221    6/2015
CN    105302266    2/2016
(Continued)

OTHER PUBLICATIONS

International Search Report dated Jun. 10, 2019 issued in counterpart application No. PCT/KR2019/002048, 9 pages.

(Continued)

*Primary Examiner* — Hong Zhou
(74) *Attorney, Agent, or Firm* — The Farrell Law Firm, P.C.

(57) ABSTRACT

An electronic device includes a touch screen display including an organic light emitting layer that is formed of a plurality of pixels, a wireless communication circuit, a processor operatively coupled with the display and the wireless communication circuit, and a memory operatively coupled with the processor. The memory stores instructions that, upon execution, enable the processor to provide a first mode of displaying a first graphical user interface (GUI) on the display by using a first number of colors in a state where all the pixels are turned on, a second mode of displaying a second GUI on the display by using a second number of colors in a state where some of the pixels are turned off, and a third mode of displaying a third GUI on the display by using the first number of colors in a state where some of the (Continued)

pixels are turned off, and select one of the first mode, the second mode or the third mode on the basis of at least one of a state of the electronic device, a content of the GUI or a use pattern of a user.

20 Claims, 17 Drawing Sheets

(51) Int. Cl.
    *G06F 3/0484* (2013.01)
    *G06F 3/0488* (2013.01)
(52) U.S. Cl.
    CPC . *G06F 3/04886* (2013.01); *G09G 2320/0666* (2013.01); *G09G 2320/0673* (2013.01); *G09G 2330/021* (2013.01)
(58) Field of Classification Search
    CPC ... G09G 2320/0606; G09G 2320/0666; G09G 2320/0673; G09G 2330/021; G09G 2330/028; G09G 3/2003; G09G 3/3208
    See application file for complete search history.

(56) References Cited

U.S. PATENT DOCUMENTS

| | | | | |
|---|---|---|---|---|
| 2004/0027364 A1* | 2/2004 | Ohtani | ............. | G06F 1/3228 345/699 |
| 2006/0119562 A1* | 6/2006 | Ichikura | ............. | G09G 3/3696 345/98 |
| 2006/0227122 A1* | 10/2006 | Proctor | ............. | G09G 3/20 345/204 |
| 2009/0058842 A1 | 3/2009 | Bull et al. | | |
| 2009/0201271 A1 | 8/2009 | Michiyasu et al. | | |
| 2009/0244048 A1* | 10/2009 | Yamanaka | ......... | H04N 5/23293 345/212 |
| 2011/0040990 A1 | 2/2011 | Chan et al. | | |
| 2012/0047380 A1 | 2/2012 | Nurmi | | |
| 2013/0082607 A1* | 4/2013 | Gandhi | ............. | G09G 3/3433 315/153 |
| 2013/0093783 A1 | 4/2013 | Sullivan et al. | | |
| 2013/0111345 A1 | 5/2013 | Newman et al. | | |
| 2015/0294627 A1 | 10/2015 | Yoo et al. | | |
| 2016/0062450 A1* | 3/2016 | Han | ............. | G06F 1/3265 715/778 |
| 2017/0060229 A1 | 3/2017 | Youngs | | |
| 2017/0336851 A1 | 11/2017 | Bae et al. | | |
| 2018/0181265 A1* | 6/2018 | Kim | ............. | G06F 40/137 |
| 2018/0366084 A1* | 12/2018 | Bedi | ............. | G09G 5/00 |
| 2019/0122601 A1* | 4/2019 | Li | ............. | G09G 3/2007 |

FOREIGN PATENT DOCUMENTS

| | | |
|---|---|---|
| CN | 105388988 | 3/2016 |
| CN | 105845079 | 8/2016 |
| CN | 106030691 | 10/2016 |
| CN | 107680556 | 2/2018 |
| KR | 20030015687 | 2/2003 |
| KR | 1020110103089 | 9/2011 |
| KR | 20160054896 | 5/2016 |
| KR | 101735389 | 5/2017 |

OTHER PUBLICATIONS

European Search Report dated Dec. 22, 2020 issued in counterpart application No. 19756499.0-1203, 15 pages.
Chinese Office Action dated Mar. 29, 2021 issued in counterpart application No. 201980014399.X, 26 pages.

* cited by examiner

METHOD FOR ADAPTIVELY CONTROLLING LOW POWER DISPLAY MODE AND ELECTRONIC DEVICE THEREOF

CROSS-REFERENCE TO RELATED APPLICATION(S)

This application is based on and claims priority under 35 U.S.C. § 119 to Korean Patent Application No. 10-2018-0021149, filed on Feb. 22, 2018, in the Korean Intellectual Property Office, the disclosure of which is incorporated herein by reference in its entirety.

BACKGROUND

1. Field

The present disclosure relates generally to an apparatus and method for adaptively controlling a low power display mode in an electronic device.

2. Description of Related Art

With the growth of communication technology and semiconductor technology, electronic devices are developing into multimedia devices that provide various multimedia services. For example, an electronic device can provide a voice call service, a message service, a broadcasting service, a wireless Internet service, a camera service, or a music play service.

The electronic device can visually provide an image or a video to a user through a display. The display can include a display panel for displaying content and a display driver integrated circuit (DDI) for driving the display panel.

The electronic device can support a low power display mode of displaying content through a DDI in a state (e.g., a sleep state) where driving of a processor is restricted. For example, the processor can, before its driving is restricted, create content and forward the same to the DDI. Additionally, when the driving of the processor is restricted, the DDI can control the display panel to display the content created by the processor.

The electronic device can support a plurality of colors (e.g., about one hundred and sixty thousand) in the low power display mode to provide various pieces of information that a user may need through the low power display mode. By supporting the plurality of colors, the electronic device can display notification information registered by an external application through the low power display mode.

However, in a case in which the electronic device provides content corresponding to a gray level of two colors (i.e., black and white) through the low power display mode, unnecessary power consumption can take place, because the electronic device outputs content of one color by unnecessarily using a scheme that supports a plurality of additional colors that are not being output.

Accordingly, it may be advantageous to provide an apparatus and method for adaptively controlling a low power display mode in an electronic device.

SUMMARY

The present disclosure has been made to address the above-mentioned problems and disadvantages, and to provide at least the advantages described below.

In accordance with an aspect of the present disclosure, an electronic device includes a touch screen display including an organic light emitting layer that is formed of a plurality of pixels, a wireless communication circuit, a processor operatively coupled with the display and the wireless communication circuit, and a memory operatively coupled with the processor. The memory may store instructions that, upon execution, enable the processor to provide a first mode of displaying a first graphical user interface (GUI) on the display by using a first number of colors in a state where all the pixels are turned on, a second mode of displaying a second GUI on the display by using a second number of colors in a state where some of the pixels are turned off, the second number being less than the first number, and a third mode of displaying a third GUI on the display by using the first number of colors in a state where some of the pixels are turned off, and select one of the first mode, the second mode or the third mode on the basis of at least one of a state of the electronic device, a content of the GUI or a use pattern of a user.

In accordance with an aspect of the present disclosure, a method for operating in an electronic device includes identifying at least one of a state of the electronic device, a content of a GUI or a use pattern of a user, and selecting one of a first mode, a second mode or a third mode on the basis of the at least one of the state of the electronic device, the content of the GUI or the use pattern of the user. The first mode may include a mode of displaying a first GUI on the display by using a first number of colors in a state where all pixels included in a touch screen display of the electronic device are turned on, and the second mode may include a mode of displaying a second GUI on the display by using a second number of colors in a state where some of the pixels are turned off, the second number being less than the first number, and the third mode may include a mode of displaying a third GUI on the display by using the first number of colors in a state where some of the pixels are turned off.

In accordance with an aspect of the present disclosure, a non-transitory computer-readable storage medium for storing one or more programs is provided. The one or more programs, when executed, may identify at least one of a state of the electronic device, a content of a GUI or a use pattern of a user, and on the basis of the at least one of the state of the electronic device, the content of the GUI or the use pattern of the user, select one of a first mode of displaying a first GUI on the display by using a first number of colors in a state where all pixels included in a touch screen display of the electronic device are turned on, a second mode of displaying a second GUI on the display by using a second number of colors in a state where some of the pixels are turned off, the second number being less than the first number, or a third mode of displaying a third GUI on the display by using the first number of colors in a state where some of the pixels are turned off.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
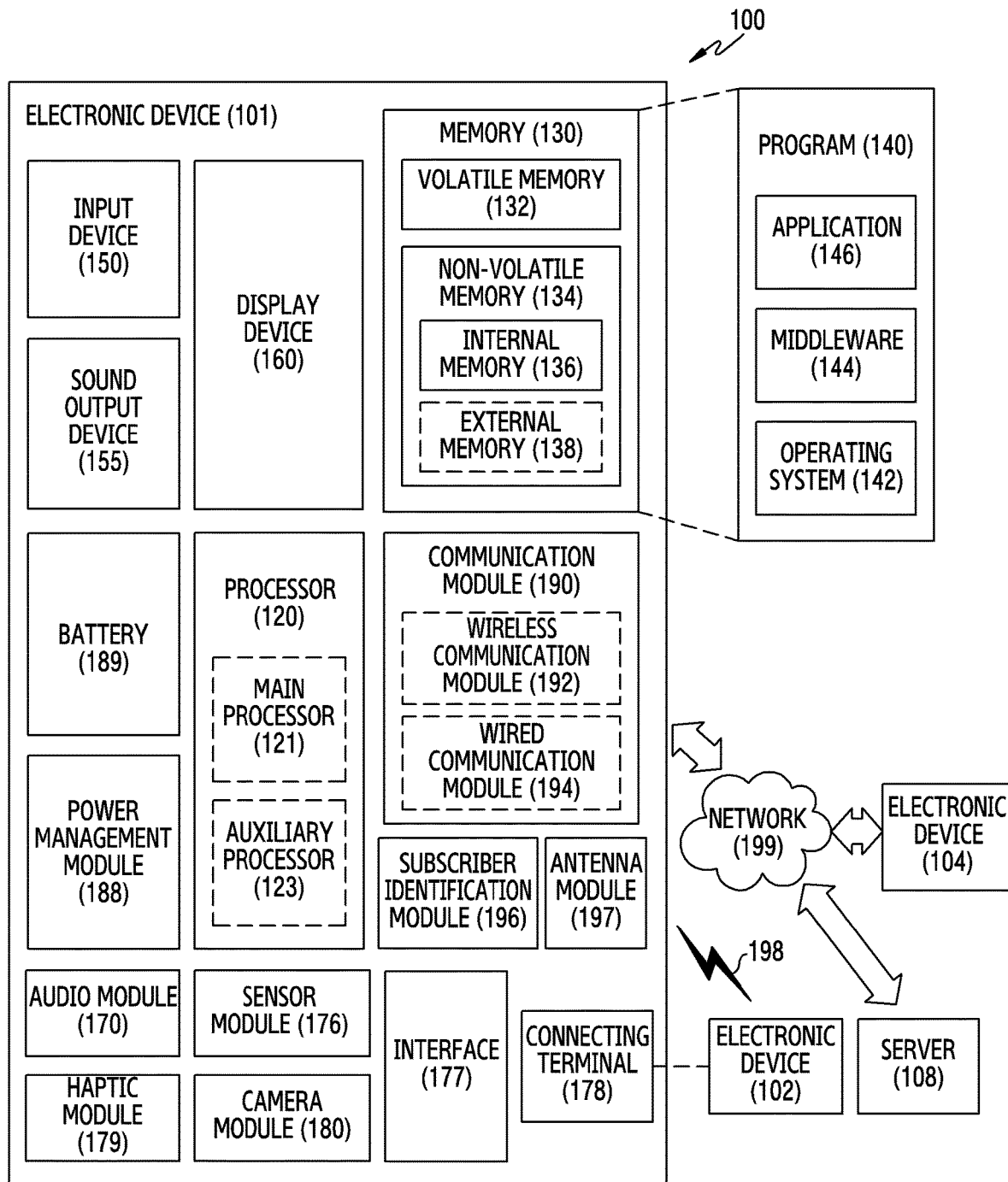
FIG. 1 illustrates a block diagram of an electronic device for controlling a low power display mode within a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor 120 of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
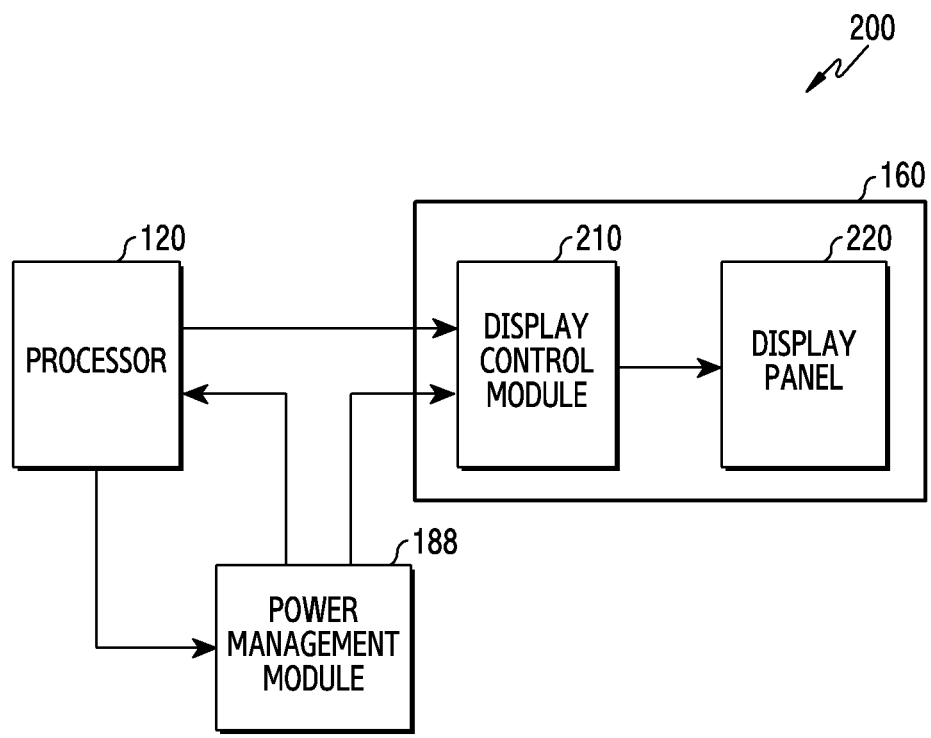
FIG. 2 illustrates a block diagram of an electronic device for displaying content in a low power display mode, according to an embodiment.

FIG. 2 illustrates a block diagram 200 of an electronic device for displaying content in a low power display mode, according to an embodiment. The block diagram 200 of the electronic device may include at least part of the electronic device 101 of FIG. 1.

The processor 120 may select a display operation mode of the electronic device 101 on the basis of at least one of a state of the electronic device 101, the content of a GUI or a use pattern of a user. For example, the electronic device 101 may provide, as the display operation mode, a first mode (e.g., a general mode) of displaying a first GUI by using a first number of colors in a state where all pixels of a display panel 220 are turned on, a second mode (e.g., a first low power display mode) of displaying a second GUI by using a second number of colors in a state where at least one pixel is turned on, or a third mode (e.g., a second low power display mode) of displaying a third GUI by using the first number of colors in a state where at least one pixel is turned on.

The processor 120 may select the second mode or the third mode, on the basis of the number of colors that will be used to display a GUI for displaying through the display panel 220 in the state (e.g., the sleep state) where the driving of the processor 120 is restricted. For example, in response to an event for entry of a low power display mode taking place, the processor 120 may select the second mode or the third mode according to a battery level of the electronic device 101. Additionally, the processor 120 may select the second mode or the third mode on the basis of a notification identifying pattern of a user in the low power display mode.

The power management module 188 may supply power for driving of at least one of the processor 120 or the display device 160, on the basis of a display operation mode of the electronic device 101. For example, in response to the electronic device 101 operating in the first mode, the power management module 188 may supply power for driving of the processor 120 and the display device 160. In response to the electronic device 101 operating in the second mode or the third mode, the power management module 188 may supply power for driving of the display device 160. In response to the electronic device 101 operating in the second mode or the third mode, the processor 120 may be restricted in its driving by the power management module 188.

In the state (e.g., the sleep state) where the driving of the processor 120 is restricted, the processor 120 may create content for displaying in the display panel 220, and transmit the same to the display control module 210. For example, in response to selecting the display operation mode of the electronic device 110 as the second mode or the third mode, the processor 120 may create content for displaying through the display panel 220 and transmit the same to the display control module 210. Before converting the display operation mode of the electronic device 110 into the second mode or the third mode, the processor 120 may create content for displaying through the display panel 220 and transmit the same to the display control module 210. In response to a notification event taking place while the electronic device 101 operates in the second mode or the third mode, the processor 120 may create content corresponding to the notification event and transmit the same to the display control module 210.

The processor 120 may control the display control module 210 to display content of the display panel 220 on the basis of the display operation mode of the electronic device 101. In response to the electronic device 101 operating in the first mode or the third mode, the processor 120 may control the display control module 210 to display a GUI by using a first number of colors (i.e., a first set of colors or a predetermined number of colors). In response to the electronic device 101 operating in the second mode, the processor 120 may control the display control module 210 to display the GUI by using a second number of colors. The second number of colors (e.g., eight) may include less colors than the first number of colors (e.g., about one hundred and sixty thousand).

The processor 120 may set a power consumption level of the electronic device 101. The processor 120 may control the display device 160 to display a user interface for setting the power consumption level of the electronic device 101. In response to receiving a user input corresponding to the user interface for setting the power consumption level, the processor 120 may set a power consumption level corresponding to the user input as a power consumption level of a low power display mode (e.g., the second mode or the third mode) of the electronic device 101. The processor 120 may output an operation state of the electronic device 101 at the power consumption level corresponding to the user input, through the user interface for setting the power consumption level. The operation state of the electronic device 101 may include at least one of a brightness state of the display panel 220 corresponding to the power consumption level, a quality of a GUI or application information able to display a notification event.

The processor 120 may control a display operation mode of the electronic device 101 on the basis of a power consumption level of the electronic device 101. For example, the processor 120 may set a brightness of the display panel 220 or content displayable in the low power display mode on the basis of the power consumption level of the electronic device 101. The processor 120 may set a relatively low notification priority for an application in which the displaying the notification is restricted in response to restricting the notification displaying of at least one application in the low power display mode on the basis of the power consumption level of the electronic device 101.

The display control module 210 may output at least part of an encoded content stored in the memory 130 (e.g., an internal memory of the display control module 210), to the display panel 220. For example, the display control module 210 may select at least part of the encoded content stored in the memory 130 on the basis of driving information corresponding to the content, decode the selected at least part of the encoded content, and output the decoded part of the encoded content to a given region of the display panel 220. In response to the electronic device 101 operating in the second mode, and the number of colors necessary for displaying a GUI exceeding a second number, the display control module 210 may output a color closest to a color necessary for displaying the GUI among colors of the second number, to the display panel 220, with respect to a pixel.

The display control module 210 may dynamically output displayed content to the display panel 220 in a state where driving of the processor 210 is restricted. For example, by using a timing control module to shift contents by a unit of a block, the display control module 210 may continuously provide the contents to the display panel 220.

Figure 3:
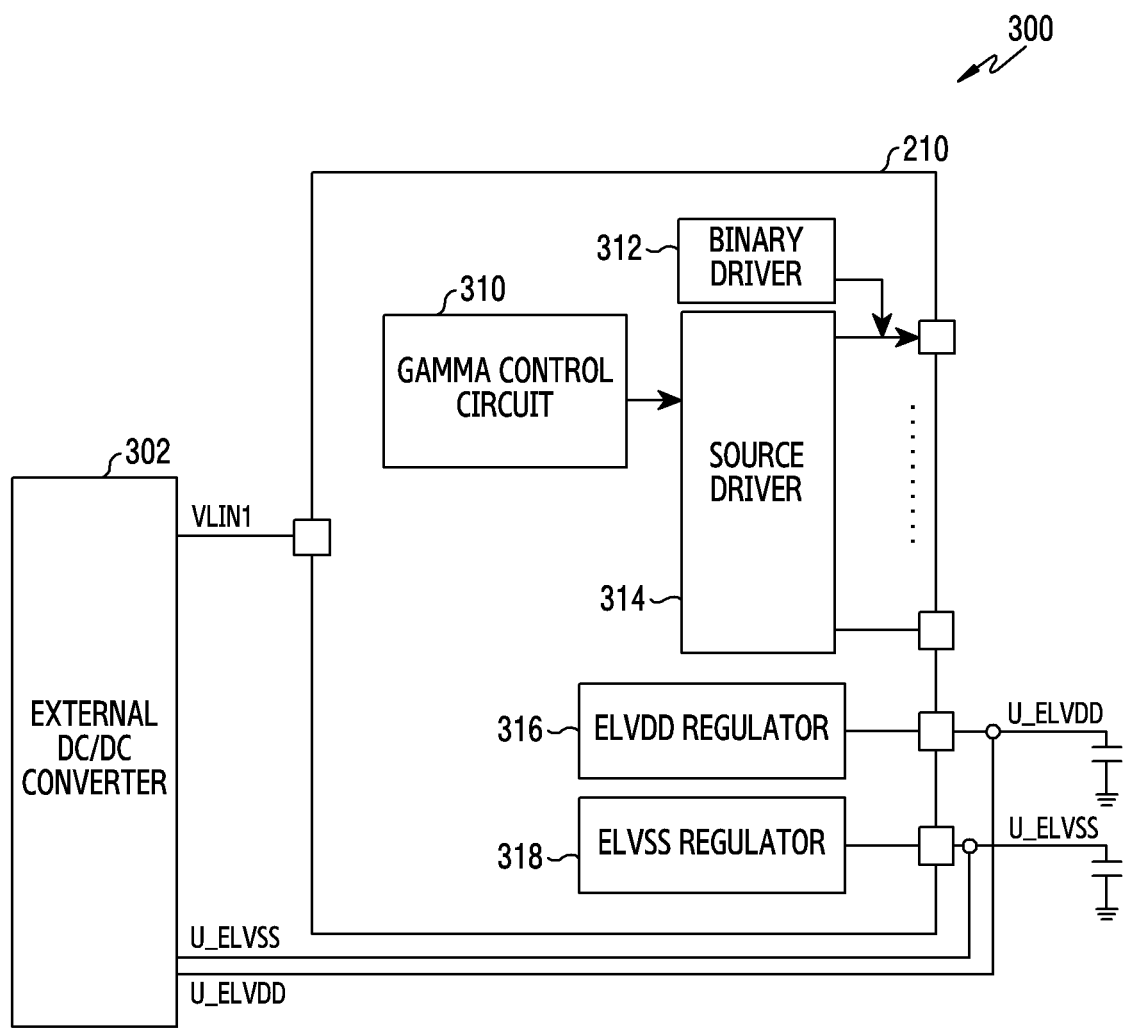
FIG. 3 illustrates a block diagram of a display control module, according to an embodiment.
Figure 4A:
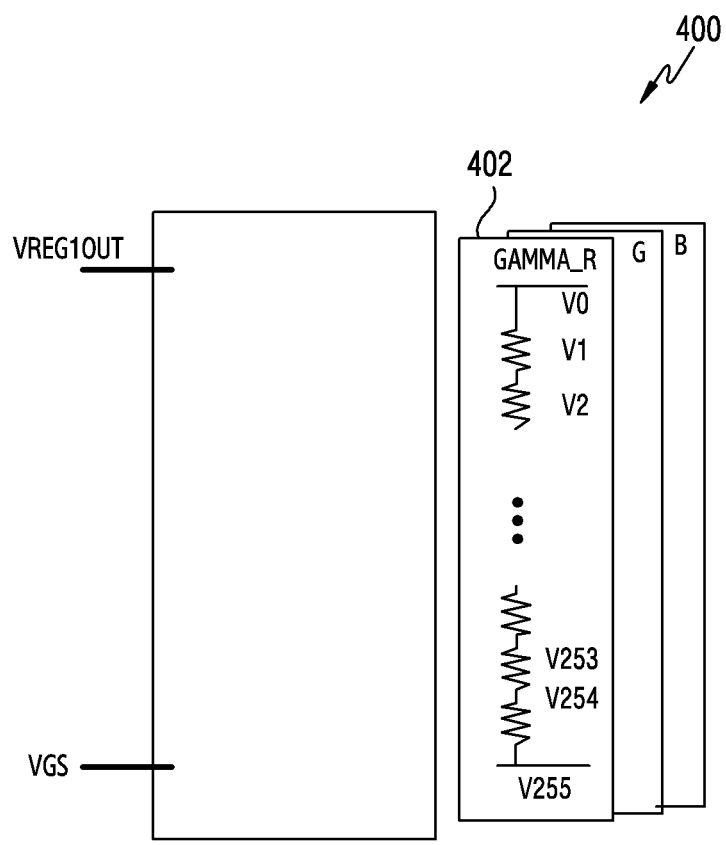
FIG. 4A illustrates a block diagram of a gamma control circuit, according to an embodiment.
Figure 4B:
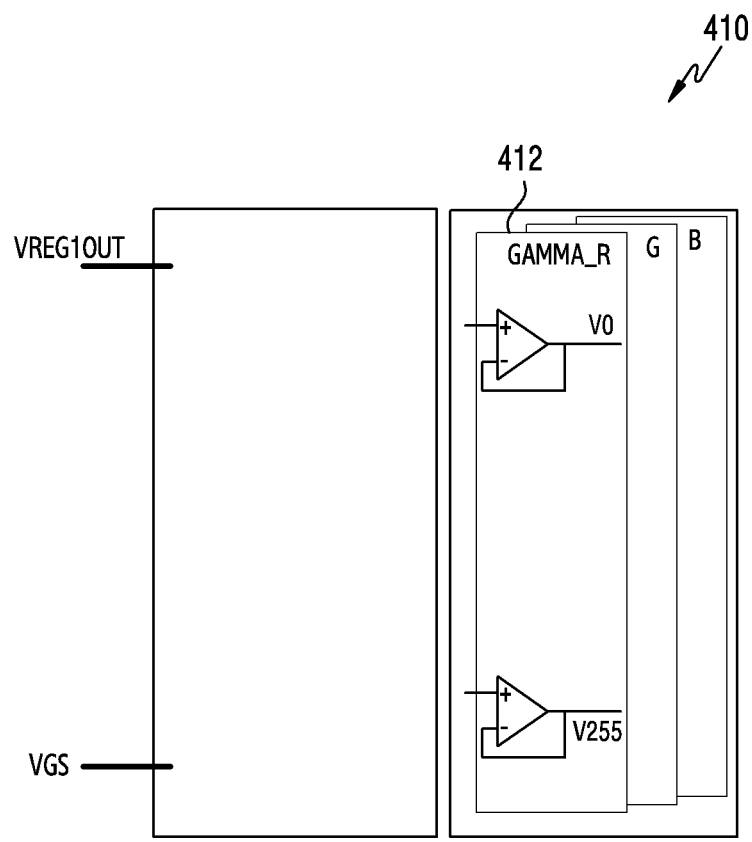
FIG. 4B illustrates a block diagram of a binary driver, according to an embodiment.

FIG. 3 illustrates a block diagram 300 of a display control module, according to an embodiment. FIG. 4A illustrates a block diagram 400 of a gamma control circuit, according to an embodiment. FIG. 4B illustrates a block diagram 410 of a binary driver, according to an embodiment. The display control module 210 of FIG. 3 may include at least part of the display control module 210 of FIG. 2.

An external direct current (DC)/DC converter 302 may supply power for driving of the display control module 210. In response to the electronic device 101 operating in the first mode, the external DC/DC converter 302 may supply basic power (VLIN1) for driving of the display control module 210 and additional power (U_ELVSS, U_ELVDD) for supporting a high-efficiency brightness (about 420 nit). In response to the electronic device 101 operating in the second mode or the third mode, the external DC/DC converter 302 may supply the basic power (VLIN1) for driving of the display control module 210. Alternatively, in response to the electronic device 101 operating in the second mode or the third mode, the external DC/DC converter 302 may restrict supplying of the additional power (U_ELVSS, U_ELVDD) to the display control module 210.

Referring to FIG. 3, the display control module 210 includes a gamma control circuit 310, a binary driver 312, a source driver 314, an ELVDD regulator 316 and an ELVSS regulator 318.

In response to the electronic device 101 operating in the second mode or the third mode, the display control module 210 may be driven using an internal power supply of the display control module 210. The internal power supply of the display control module 210 may include at least one of the ELVDD regulator 316 or the ELVSS regulator 318.

In response to the electronic device 101 operating in the first mode (general mode), the display control module 210 may be driven using a power supply provided from the external DC/DC converter 302. The display control module 210 may be driven at a low efficiency voltage which is lower than a high efficiency voltage.

In response to the electronic device 101 operating in the third mode, the display control module 210 may output content to the display panel 220 by using the gamma control circuit 310 and the source driver 314. To support a first number of colors, as in FIG. 4A, the gamma control circuit 310 may include two hundred and fifty six resistors 402 in order to support two hundred and fifty six gray levels for each of red (R), green (G) and blue (B) by each pixel. By controlling the coupling of a plurality of resistors on the basis of content for displaying in the display panel 220, the gamma control circuit 310 may identify a scale voltage of each pixel for displaying the content. The source driver 314 may output the scale voltage of each pixel identified by the gamma control circuit 310, through the display panel 220.

In response to the electronic device 101 operating in the second mode, the display control module 210 may output content to the display panel 220 by using the binary driver 312. For example, to support a second number of colors, as in FIG. 4B, the binary driver 312 may include two resistors 412 in order to support two gray levels for each of R, G and B by each pixel. By controlling the coupling of two resistors on the basis of content for displaying in the display panel 220, the binary driver 312 may identify a scale voltage of each pixel for displaying the content. The binary driver 312 may output the scale voltage of each pixel to the display panel 220.

Figure 5:
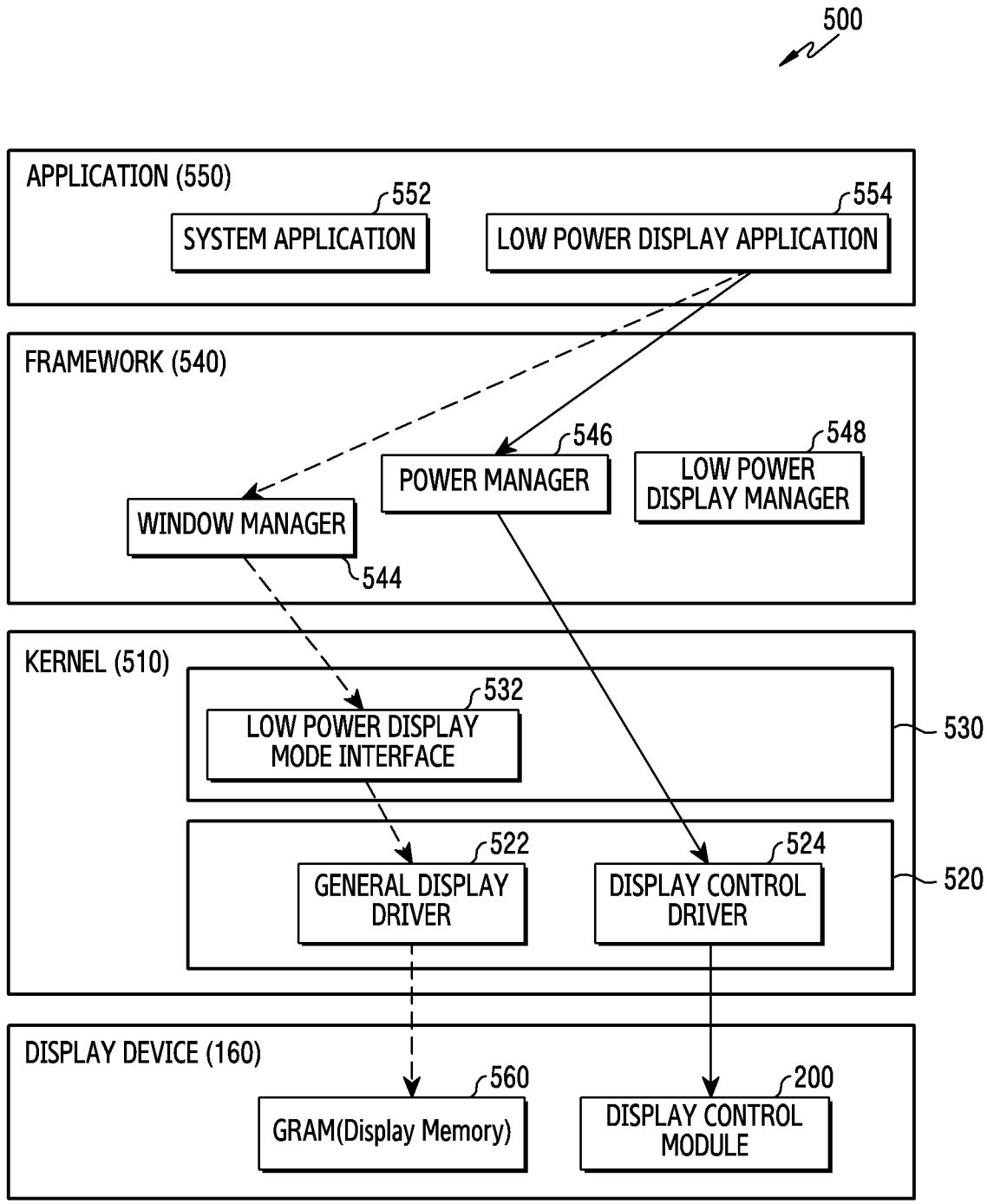
FIG. 5 illustrates a block diagram of a program for displaying a low power display mode in an electronic device, according to an embodiment.

FIG. 5 illustrates a block diagram of a program 500 for controlling a low power display mode in an electronic device, according to an embodiment. The electronic device which executes the program 500 may include at least part of the electronic device 101 of FIG. 1.

Referring to FIG. 5, the program 500 may include an operating system (OS) 142 for controlling resources related to the electronic device 101, and/or various applications 550 run on the IS. For example, the OS may include Android™, iOS™, Windows™, Symbian™, Tizen™, or Bada™.

The program 500 may include a kernel 510 (e.g., the OS 142), a framework 540 (e.g., the middleware 144) and the application 550. At least a part of the program 500 may be preloaded in the electronic device 101 upon manufacturing, or may be downloaded or updated from an external electronic device (e.g., the electronic device 102 or 104, or the server 108) in a use environment of a user.

The application 550 may include a system application 552 or a low power display application 554 (e.g., an always on display (AOD)). In response to a display operation mode of the electronic device 101 being converted into a low power display mode (e.g., the second mode or the third mode), the low power display application 554 may create content for displaying through the display device 160 while the electronic device 101 operates in the low power display mode. In response to a notification event taking place while the electronic device 101 operates in the low power display mode, the low power display application 554 may create content corresponding to the notification event. In response to the display operation mode of the electronic device 101 being selected as the second mode or the third mode, the low power display application 554 may control the display control module 210 to display content in the display panel 220 on the basis of the selected display operation mode.

The framework 540 may provide the application 550 with various functions such that the application 550 may use a function or information which is provided by one or more resources of the electronic device 101. The framework 540 may include a window manager 544, a power manager 546 or a low power display manager 548. The framework 540 may dynamically delete some existing elements or add new elements. The window manager 544 may manage a GUI resource which is used in a screen. The window manager 544 may create a window corresponding to content for displaying in the display panel 220 by using display information created through at least one view. The power manager 546 may manage a capacity of a battery, a temperature or a power supply, and use corresponding information to identify or provide power information necessary for an operation of the electronic device 101. The power manager 546 may supply power corresponding to a display operation mode or power consumption level of the electronic device 101 on the basis of the control of the low power display application 554. In response to the electronic device 101 operating in the second mode or the third mode, the low power display manager 548 may provide state information of the electronic device 101 to the low power display application 554. In response to the electronic device 101 operating in the second mode or the third mode, the low power display manager 548 may control a brightness of the display panel 220 on the basis of the power consumption level of the electronic device 101.

The kernel 510 may control (e.g., allocate or recover) a system resource (e.g., a process, a memory or a power supply) of the electronic device 101. The kernel 510 may include one or more drivers 520 to drive other hardware devices of the electronic device 101, such as the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197. The drivers 520 may include a general display driver 522 or a display control driver 524. The general display driver 522 may store content data received through an interface of a graphic layer 530 in a memory 560 of the display device 160. In response to receiving content data through a low power display mode interface 532 of the graphic layer 530, the general display driver 522 may identify that the corresponding content data is content data for displaying during the low power display mode. The display control driver 524 may control an operation of the display control module 210 on the basis of the second mode or third mode of the electronic device 101. The display control driver 524 may set the number of colors that are used for displaying content in the display panel 220 on the basis of a display operation mode of the electronic device 101.

According to various embodiments of the present disclosure, an electronic device may include a touch screen display including an organic light emitting layer that is formed of a plurality of pixels, a wireless communication circuit, a processor operatively coupled with the display and the wireless communication circuit, and a memory operatively coupled with the processor, and the memory may store instructions that, upon execution, enable the processor to provide a first mode of displaying a first graphical user interface (GUI) on the display by using a first number of colors in a state where all the pixels are turned on, a second mode of displaying a second GUI on the display by using a second number of colors in a state where some of the pixels are turned off, the second number being less than the first number, and a third mode of displaying a third GUI on the display by using the first number of colors in a state where some of the pixels are turned off, and select one of the first mode, the second mode or the third mode on the basis of at least one of a state of the electronic device, the content of the GUI or a use pattern of a user.

The second number of colors may include eight, and the first number of colors may include about one hundred and sixty thousand.

The electronic device may include instructions for enabling the processor to identify whether the GUI is related to at least one selected application program, and select the second mode or the third mode on the basis of at least part of the identifying.

The electronic device may include instructions for enabling the processor to select the third mode, in response to the GUI not being related to the at least one selected application program.

The at least one selected application program may include at least one application program which is selected based on a power consumption level of the electronic device among application programs installed in the electronic device.

The electronic device may include instructions for enabling the processor to identify a color necessary for displaying the content of the GUI, and select the third mode in response to the color including a color not included in the second number of colors.

The electronic device may include instructions for enabling the processor to identify a battery level of the electronic device on the basis of the state of the electronic device, and select the second mode in response to the battery level of the electronic device being lower than a given battery level.

The electronic device may include instructions for enabling the processor to identify a time point of deletion of a notification event related to at least one application program on the basis of the use pattern of the user, and select the second mode or the third mode on the basis of the deletion time point.

Figure 6:
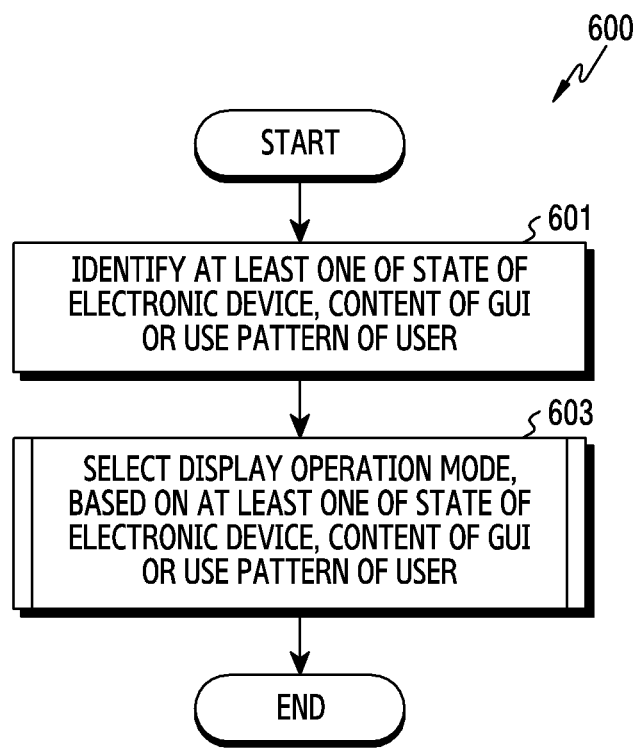
FIG. 6 illustrates a flowchart for selecting a display operation mode in an electronic device, according to an embodiment.

FIG. 6 illustrates a flowchart 600 for selecting a display operation mode in an electronic device, according to an embodiment. The electronic device may include at least part of the electronic device 101 of FIG. 1.

Referring to FIG. 6, in step 601, the electronic device identifies at least one of a state of the electronic device, content of a graphical user interface (GUI) or a use pattern of a user. The state of the electronic device may include at least one of a battery level of the electronic device 101 or a power consumption level of the electronic device 101 during a low power display mode. The content of the GUI may include color information necessary for displaying the content of the GUI through the display device 160. The use pattern of the user may include pattern information in which the user of the electronic device 101 identifies notification information.

In step 603, the electronic device selects a display operation mode of the electronic device on the basis of at least one of the state of the electronic device, the content of the GUI or the use pattern of the user. The processor 120 may select a display operation mode among a first mode, a second mode or a third mode on the basis of at least one of the state of the electronic device, the content of the GUI or the use pattern of the user. The first mode may include a general mode for displaying a first GUI by using a first number of colors in a state where all pixels of the display panel 220 are turned on. The second mode may include a first low power display mode for displaying a second GUI by using a second number of colors in a state where at least one pixel of the display panel 220 is turned on. The third mode may include a second low power display mode for displaying a third GUI by using the first number of colors in a state where at least one pixel of the display panel 220 is turned on. The second number of colors (e.g., eight) may include fewer colors than the first number of colors of the first number of colors (e.g., about one hundred and sixty thousands).

Figure 7:
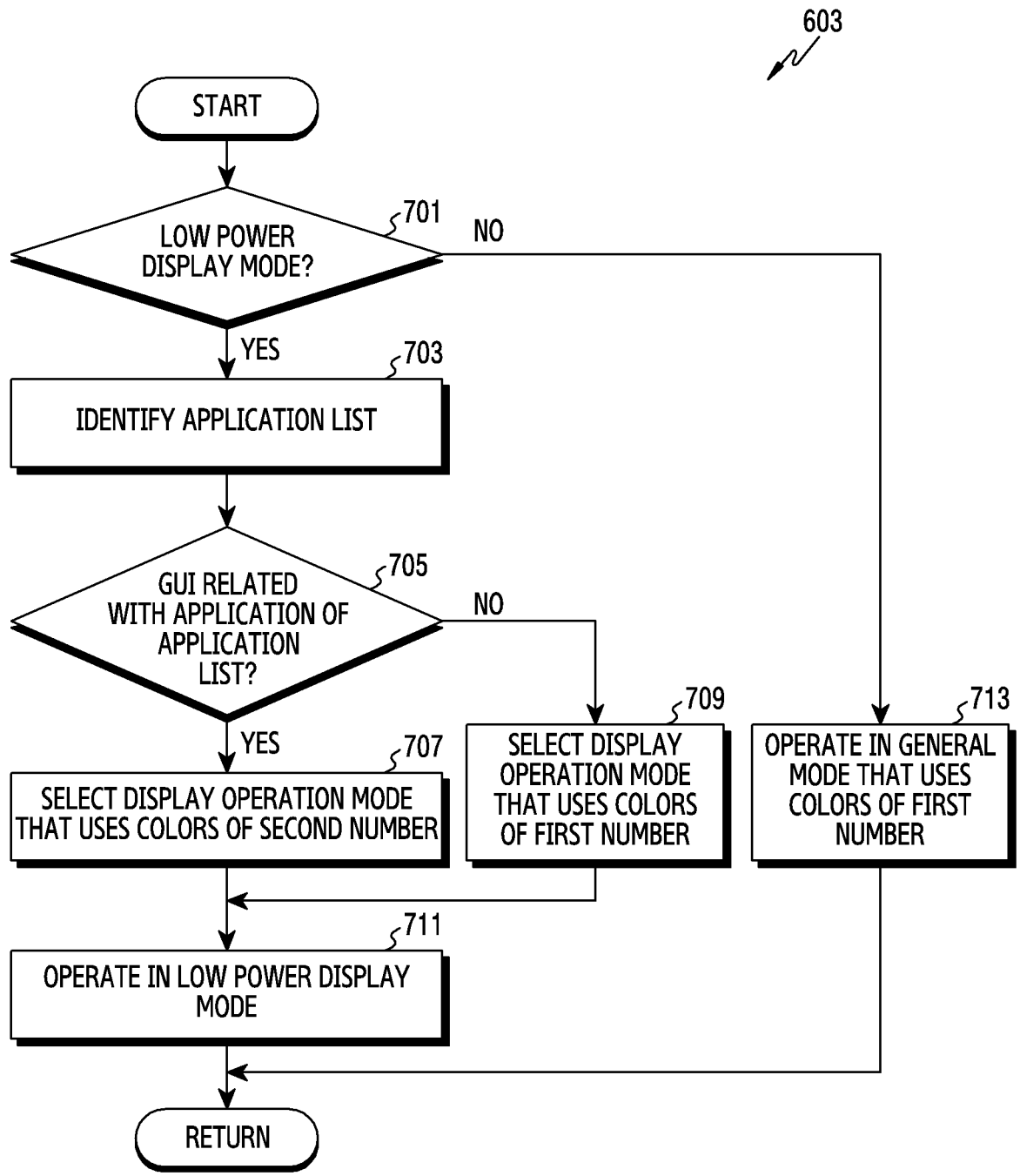
FIG. 7 illustrates a flowchart for selecting a display operation mode on the basis of a notification object of an application in an electronic device, according to an embodiment.

FIG. 7 illustrates a flowchart for selecting a display operation mode on the basis of a notification object of an application in an electronic device, according to an embodiment. The flowchart of FIG. 7 may represent the procedure for selecting the display operation mode of the electronic device in step 603 of FIG. 6. The electronic device may include at least part of the electronic device 101 of FIG. 1.

Referring to FIG. 7, in step 701, the electronic device identifies whether an event for conversion into a low power display mode takes place. For example, in response to the processor 120 of the electronic device 101 being converted into a sleep state, the processor 120 may identify that the event for conversion into the low power display mode takes place. The sleep state conversion of the processor 120 may take place based on reception of a user input (e.g., an input of selection of a power button) for the sleep state conversion of the processor 120, or a duration of a non-reception interval of the user input (i.e., if the user does not provide an input for a period of time).

In step 713, in response to the event for conversion into the low power display mode not taking place, the electronic device operates in a first mode. For example, the processor 120 may control the display control module 210 to display a GUI by using all pixels of the display panel 220 and a first number of colors.

In step 703, in response to the event for conversion into the low power display mode taking place, the electronic device identifies an application list. For example, the application list may include at least one application that uses a second number of colors in displaying a notification object corresponding to a notification event among applications stored in the electronic device 101. At a time point when the notification event of the application in the first mode of the electronic device 101 is being processed, the processor 120 may obtain color information that is used for displaying the notification object registered to the corresponding application. In response to using the second number of colors in displaying the notification object, the processor 120 may add the application for which the notification event has occurred, to the application list.

In step 705, the electronic device identifies whether a GUI for displaying in the display device 160 during the low power display mode is related to the at least one application included in the application list. For example, the processor 120 may identify whether at least one application capable of displaying a notification event during the low power display mode is included in the application list identified in step 703.

In step 707, in response to the GUI in the display device 160 during the low power display mode being related to the at least one application included in the application list, the electronic device selects a display operation mode of the electronic device, as a second mode. For example, in response to the at least one application capable of displaying the notification event during the low power display mode being included in a given application list, the processor 120 may control the display control module 210 to output the GUI by using the second number of colors.

In step 709, in response to the GUI for displaying in the display device 160 during the low power display mode not being related to the at least one application included in the application list, the electronic device selects the display operation mode of the electronic device as a third mode. For example, in response to the at least one application capable of displaying the notification event during the low power display mode not being included in the given application list, the processor 120 may control the display control module 210 to output the GUI by using the first number of colors.

In step 711, the electronic device operates in the low power display mode. For example, in a state where driving of the processor 120 is restricted, the display control module 210 may display the GUI through the display panel 220, on the basis of the display operation mode (e.g., the second mode or third mode) of the electronic device 110 selected by the processor 120. In response to the electronic device 101 operating in the second mode, the display control module 210 may output the GUI by using the second number of colors. In response to the electronic device 101 operating in the third mode, the display control module 210 may output the GUI by using the first number of colors.

In response to needing a color other than the second number of colors upon displaying a new notification object of an application included in the application list, the electronic device 101 may eliminate the corresponding application from the application list.

Figure 8:
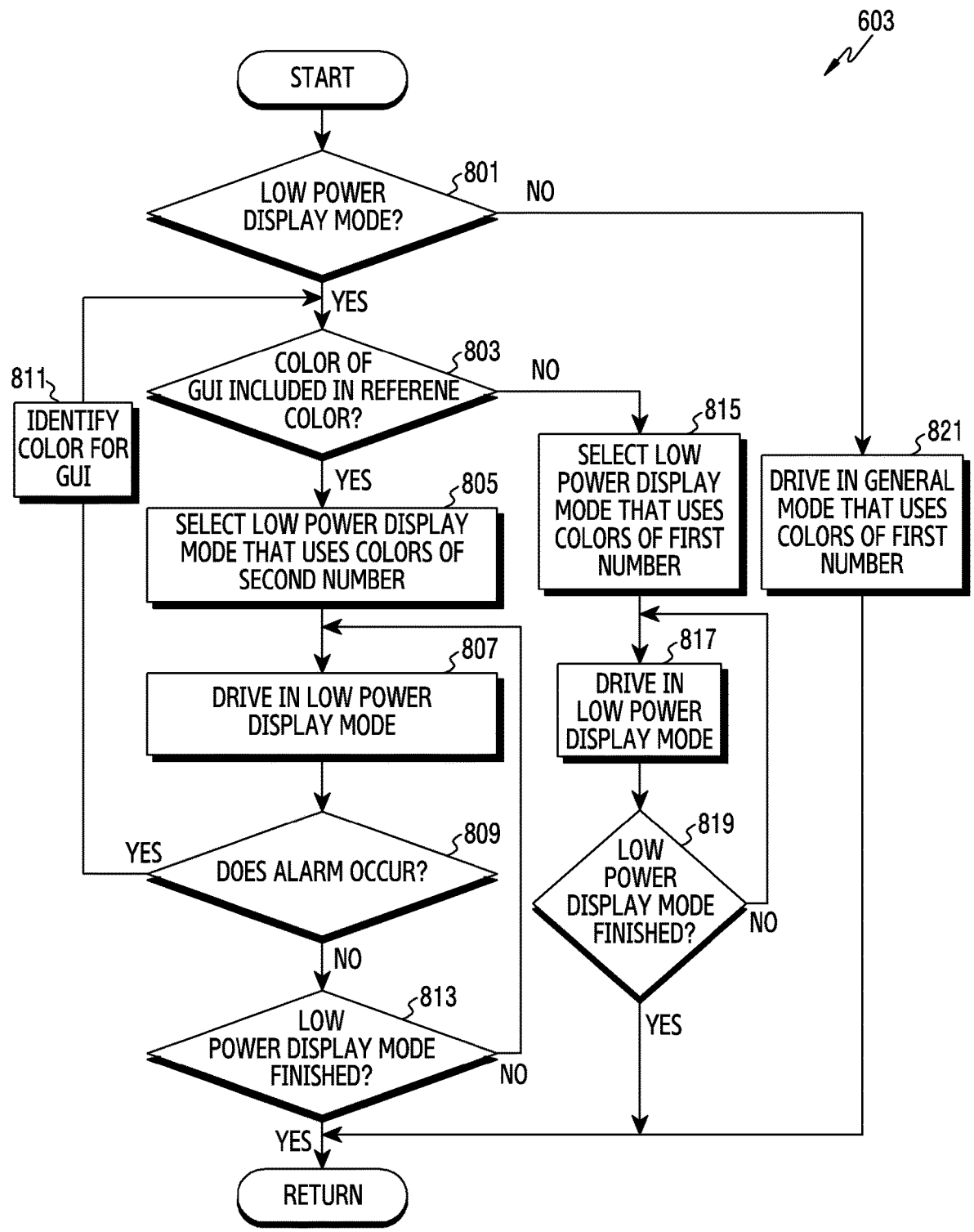
FIG. 8 illustrates a flowchart for selecting a display operation mode on the basis of the content of a GUI in an electronic device, according to an embodiment.

FIG. 8 illustrates a flowchart for selecting a display operation mode on the basis of the content of a GUI in an electronic device, according to an embodiment. The flowchart of FIG. 8 may represent the procedure for selecting the display operation mode of the electronic device in step 603 of FIG. 6. The electronic device may include at least part of the electronic device 101 of FIG. 1.

Referring to FIG. 8, in step 801, the electronic device identifies whether an event for conversion into a low power display mode takes place. For example, in response to a user input for sleep state conversion of the electronic device 101 being received, the processor 120 may identify that the event for conversion into the low power display mode takes place. In response to an event for processing in the processor 120 not taking place during a reference time, the processor 120 may identify that the event for conversion into the low power display mode takes place.

In step 821, in response to the event for conversion into the low power display mode not taking place, the electronic device operates in a first mode. For example, the processor 120 may control the display device 160 to display a GUI related with an application that is being run by using all pixels of the display panel 220.

In step 803, in response to the event for conversion into the low power display mode taking place, the electronic device identifies whether a color of a GUI for displaying in the display device 160 while the electronic device operates in the low power display mode is included in a reference color. For example, in step 601 of FIG. 6, the processor 120 identifies whether a color used for displaying the content of the identified GUI is included in the reference color. The reference color may include the number of colors of a second number (e.g., eight) used for displaying the GUI in a second mode.

In step 805, in response to the color of the GUI for displaying in the display device 160 while the electronic device operates in the low power display mode being included in the reference color, the electronic device selects the low power display mode of the electronic device as a low power display mode (second mode) that uses the second number of the colors. The second number of colors (e.g., eight) may include white, black, red, green, blue, yellow, magenta and cyan which are displayable as each of R, G and B to support two gray levels by each pixel.

In step 807, the electronic device operates (i.e. drives) in the low power display mode which uses the colors of the second number. For example, in a state where driving of the processor 120 is restricted, the display control module 210 may display a GUI through the display panel 220 by using the second number of colors selected by the processor 120.

In step 809, the electronic device identifies whether a notification event takes place while the electronic device operates in the low power display mode. For example, the processor 120 may convert a state of the electronic device to a turn-off state while the electronic device 101 operates in the low power display mode. In response to the notification event taking place during the low power display mode, the processor 120 may be temporarily turned on so as to process the notification event.

In response to the notification event (i.e., an alarm) taking place, in step 811, the electronic device identifies a color of a GUI that is updated by the notification event. For example, in response to being turned on by the notification event during the low power display mode, the processor 120 may identify a color of a GUI that is used for displaying a notification object corresponding to the notification event.

In step 803, the electronic device identifies whether the color of the GUI of the notification object corresponding to the notification event is included in the reference color, and again selects the display operation mode of the electronic device. For example, the processor 120 may again identify the number of colors that will be used for displaying the GUI in the low power display mode on the basis of the color of the GUI that is used for displaying the notification object.

In step 813, in response to the notification event not occurring, the electronic device identifies whether the low power display mode is finished.

In response to the low power display mode being maintained, in step 807, the electronic device maintains the low power display mode that uses the second number of colors.

In step 815, in response to the color of the GUI not being included as a reference color while the electronic device operates in the low power display mode, the electronic device selects the low power display mode of the electronic device as a low power display mode (third mode) that uses the first number of colors. The first number of colors may include about one hundred and sixty thousand displayable colors represented as each of R, G and B supports two hundred and fifty six gray levels for each pixel.

In step 817, the electronic device operates in the low power display mode which uses the first number of colors. For example, in a state where driving of the processor 120 is restricted, the display control module 210 may display a GUI through the display panel 220 by using the first number of colors selected by the processor 120.

In step 819, the electronic device identifies whether the low power display mode is finished. For example, the electronic device 101 may identify whether a user input (e.g., a selection of a power button) for a turn-on state conversion of the processor 120 is received through the input device 150 (i.e., the electronic device 101 may identify whether a call is received through the communication module 190).

In response to the low power display mode being maintained, in step 817, the electronic device maintains the low power display mode that uses the first number of colors.

In response to a color that may be used in the low power display mode being restricted while the electronic device 101 operates in the low power display mode (third mode) that uses the first number of colors, the electronic device 101 may convert the display operation mode into the low power display mode (second mode) that uses the second number of colors. For example, the color that may be used in the low power display mode may be restricted based on state information (e.g., battery level information) of the electronic device 101 or a user input.

Figure 9:
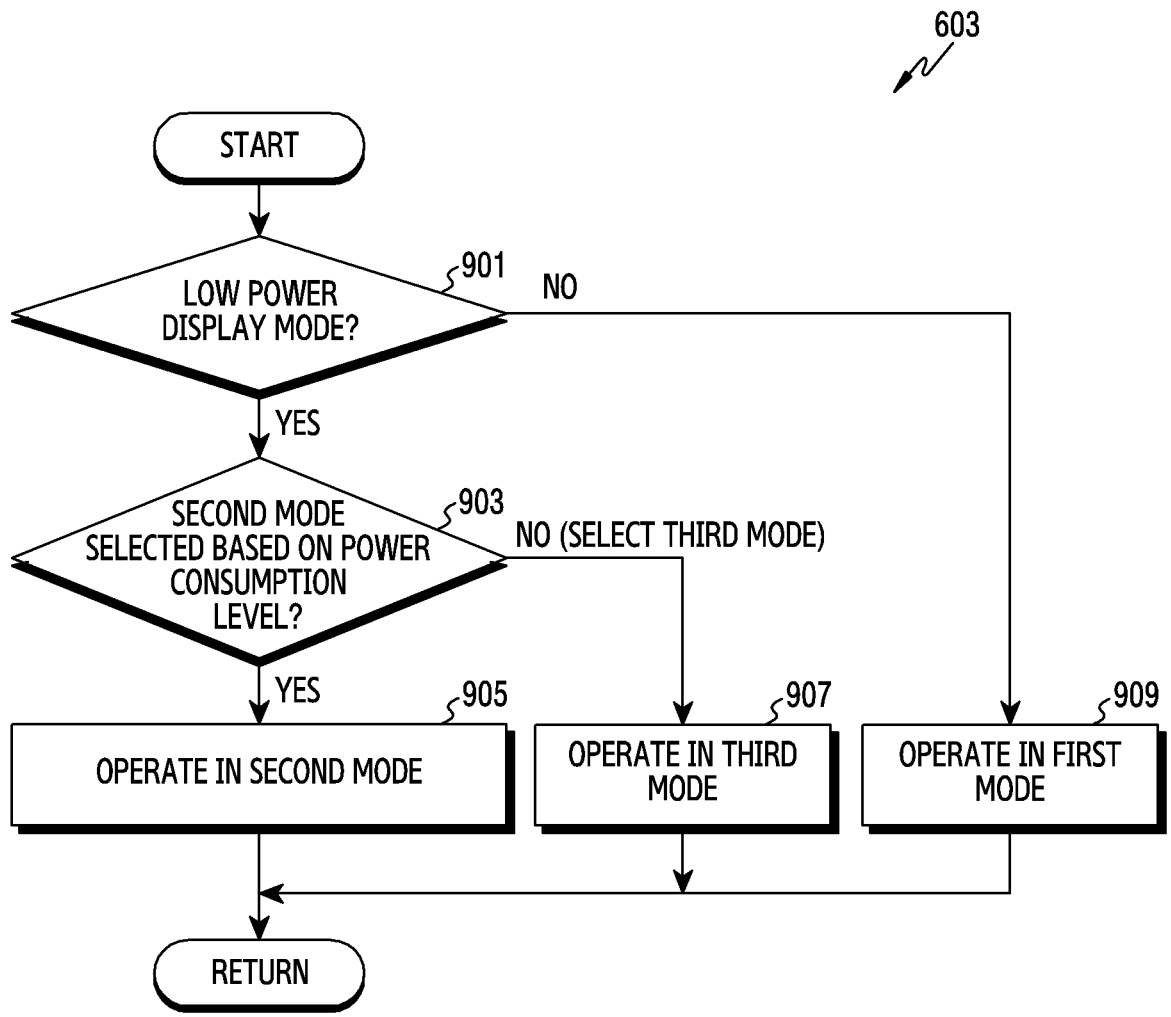
FIG. 9 illustrates a flowchart for selecting a display operation mode on the basis of a power consumption level in an electronic device, according to an embodiment.

FIG. 9 illustrates a flowchart for selecting a display operation mode on the basis of a power consumption level in an electronic device, according to an embodiment. The flowchart of FIG. 9 may represent the procedure for selecting the display operation mode of the electronic device in step 603 of FIG. 6. The electronic device may include at least part of the electronic device 101 of FIG. 1.

Referring to FIG. 9, in step 901, the electronic device identifies whether an event for conversion into a low power display mode takes place. For example, the processor 120 may identify whether an event for sleep state conversion of the electronic device 101 takes place. In response to the event for conversion into the sleep state taking place, the processor 101 may identify that the event for conversion into the low power display mode takes place.

In step 909, in response to the event for conversion into the low power display mode not occurring, the electronic device operates in a first mode. The processor 120 may control the display device 160 to display a GUI related to an application that is being run in the electronic device 101.

In step 903, in response to the event for conversion into the low power display mode occurring, the electronic device identifies whether a second mode is selected based on a power consumption level of the electronic device. The power consumption level of the electronic device 101 may be set based on state information (e.g., battery level information) of the electronic device 101, or may be set based on a user input.

In step 905, in response to the second mode being selected based on the power consumption level of the electronic device, the electronic device operates in a low power display mode of the second mode that uses a second number of colors. For example, in response to the display operation mode of the electronic device 101 being selected as the second mode, the processor 120 may set a relatively low notification priority for an application that uses a color other than the second number of colors such that a notification event of the corresponding application does not take place during the low power display mode. After setting the notification priority of the application, the processor 120 may be turned off.

In step 907, in response to a third mode being selected based on the power consumption level of the electronic device, the electronic device operates in a low power display mode of the third mode that uses the first number of colors. For example, by using the first number of colors, the display control module 210 may display a GUI through the display panel 220 during the low power display mode of the third mode.

The second mode and the third mode may set the number of pixels for displaying content differently. For example, because the second mode restricts an application that will invoke a notification event from the third mode, the second mode may display content by using pixels equal to or less than the third mode.

The electronic device 101 may adjust a brightness of the GUI on the basis of the power consumption level of the electronic device 101.

Figure 10:
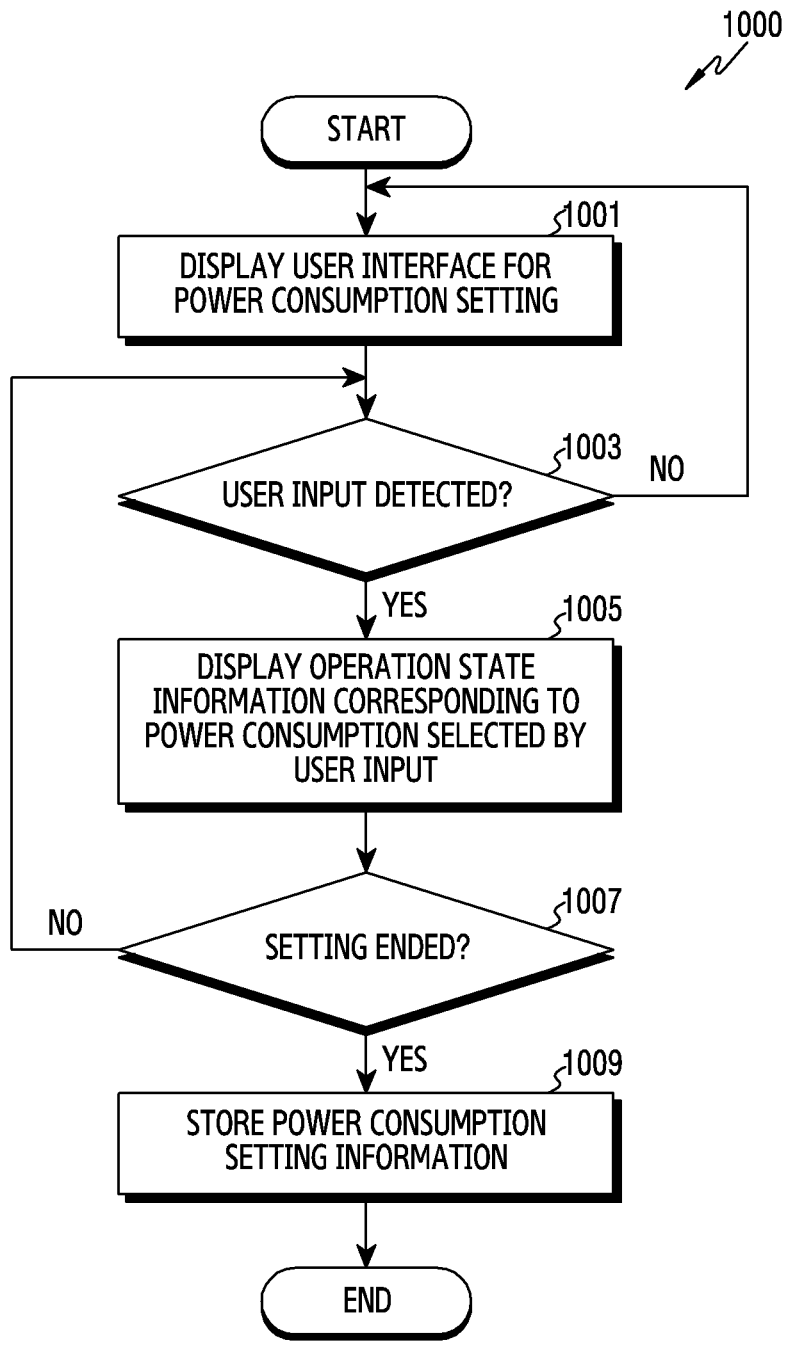
FIG. 10 illustrates a flowchart for setting a power consumption level in an electronic device, according to an embodiment.
Figure 11A:
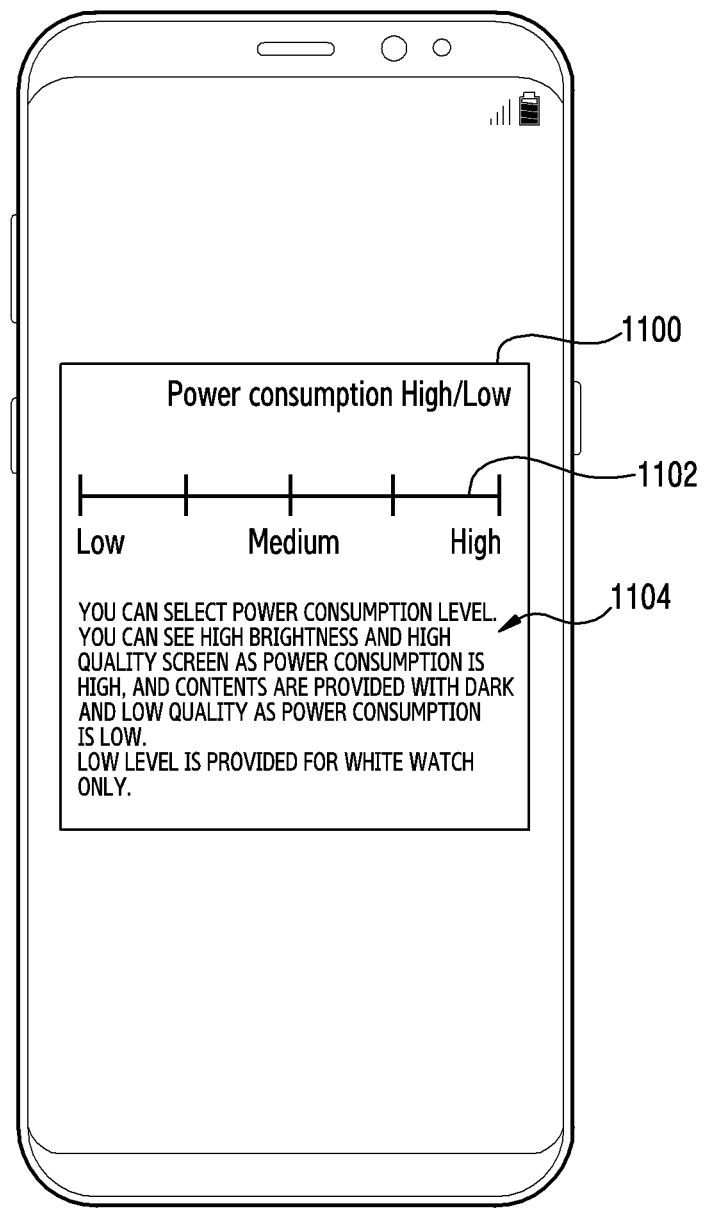
FIG. 11A to FIG. 11D illustrate a user interface for setting a power consumption level, according to an embodiment.
Figure 11B:
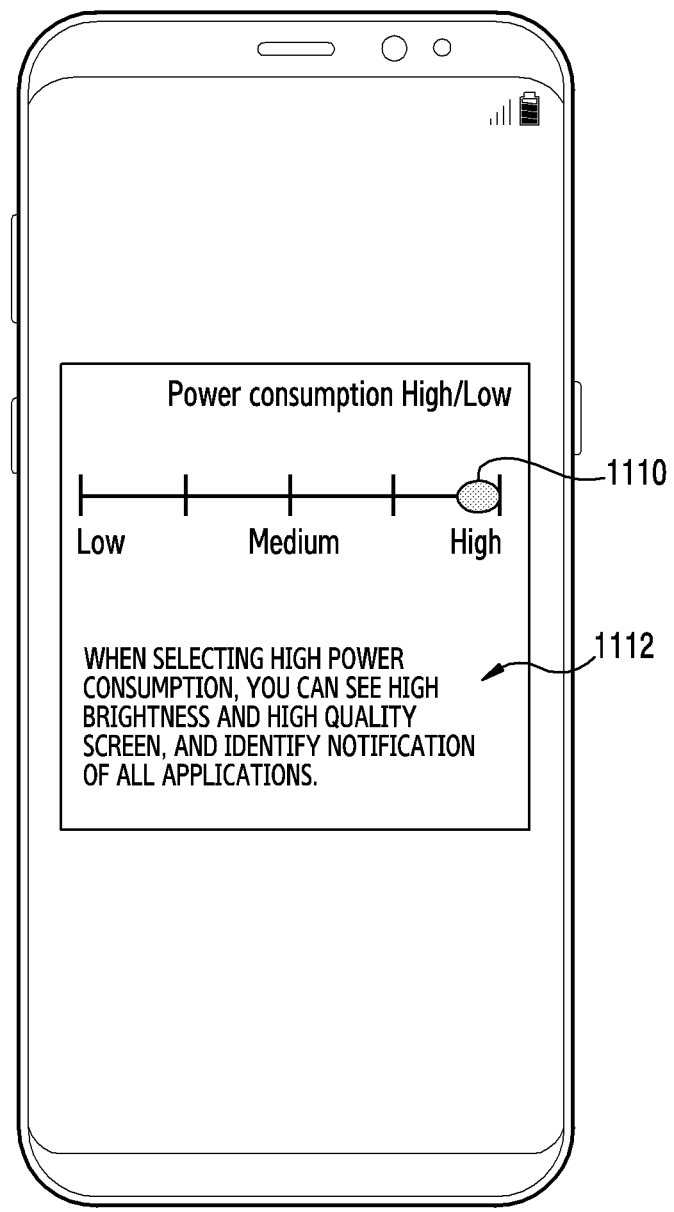
Figure 11C:
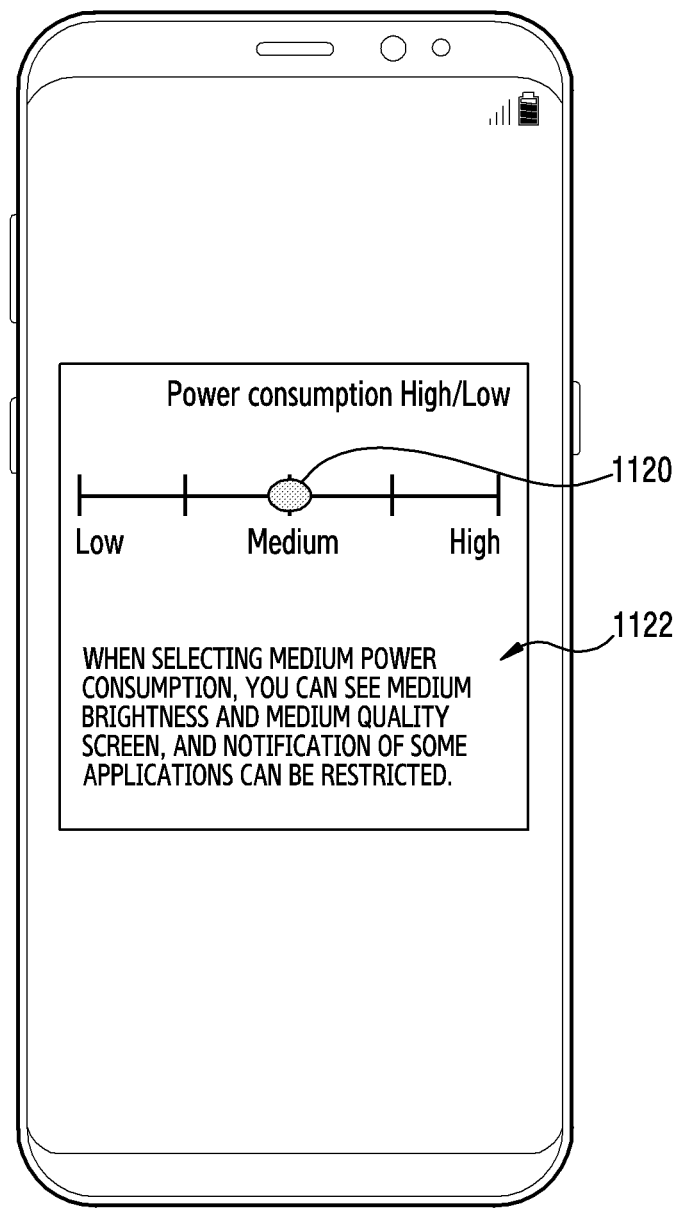
Figure 11D:
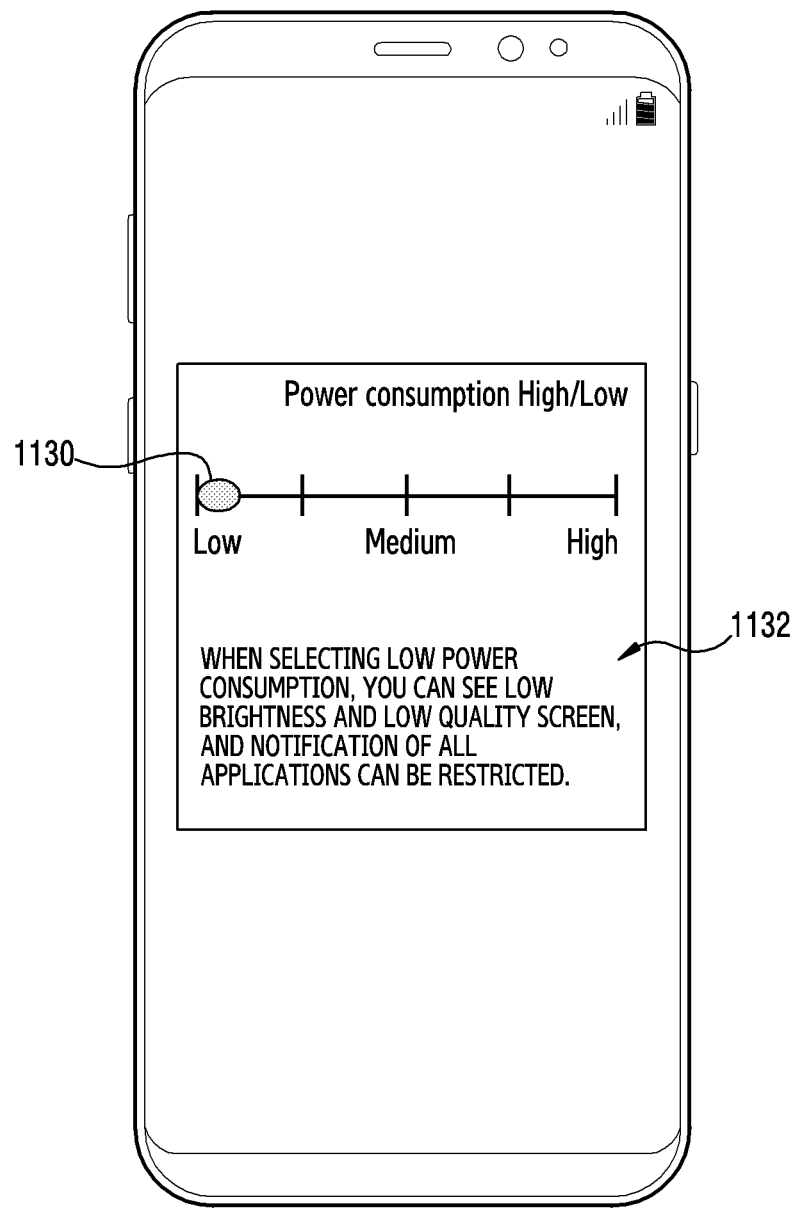

FIG. 10 illustrates a flowchart for setting a power consumption level in an electronic device, according to an embodiment. FIG. 11A to FIG. 11D illustrate a user interface for setting a power consumption level, according to an embodiment. In the following description, the electronic device may include at least part of the electronic device 101 of FIG. 1.

Referring to FIG. 10, in step 1001, in response to an event for setting a power consumption level of a low power display mode of the electronic device 101 taking place, the electronic device displays a user interface for setting the power consumption level. For example, in response to receiving a user input for setting a power consumption level through the input device 150, as in FIG. 11A, the processor 120 may control the display device 160 to display a user interface 1100 for setting the power consumption level. The user interface 1100 for setting of the power consumption level may include a region 1102 for setting the power consumption level and a guidance phrase 1104 for the power consumption level.

In step 1003, the electronic device identifies whether a user input related to setting the power consumption level is received. For example, the processor 120 may identify whether a user input (e.g., a touch input) corresponding to the region 1102 for setting the power consumption level is received in the user interface 1100 of FIG. 11A.

In response to the user input related to the setting of the power consumption level not being received, in step 1001, the electronic device maintains displaying the user interface for setting the power consumption level. In response to the user input related to the user interface for setting the power consumption level not being received during a reference time, the processor 120 may identify that setting the power consumption level is finished.

In step 1005, in response to the user input related to setting the power consumption level being received, the electronic device displays operation state information of the electronic device corresponding to the power consumption level. For example, as in FIG. 11B, in response to the power consumption level being set as "high" 1110, the processor 120 may control the display device 160 to display a guidance phrase 1112 for state information of a GUI that the electronic device 101 may provide through the power consumption level of "high" in a low power display mode. As in FIG. 11C, in response to the power consumption level being set as "medium" 1120, the processor 120 may control the display device 160 to display a guidance phrase 1122 for state information of a GUI that the electronic device 101 may provide through the power consumption level of "medium" in the low power display mode. As in FIG. 11D, in response to the power consumption level being set as "low" 1130, the processor 120 may control the display device 160 to display a guidance phrase 1132 for state information of a GUI that the electronic device 101 may provide through the power consumption level of "low" in the low power display mode. The guidance phrases 1112, 1122, and 1132 for the state information of the GUI that the electronic device 101 may provide according to the power consumption level may include at least one of information pertaining to a brightness of a screen for the corresponding power consumption level, a quality of the screen or an application capable of providing a notification event.

In step 1007, the electronic device identifies whether setting the power consumption level has been completed. For example, the processor 120 may identify whether a user input related to the completion of setting the power consumption level is received. The user input related to the completion of setting the power consumption level may include a user input corresponding to a setting completion object or a gesture input related to the setting completion.

In response to setting the power consumption level not being completed, in step 1003, the electronic device identifies whether a user input related to setting the power consumption level is received.

In step 1009, in response to setting the power consumption level being completed, the electronic device stores the power consumption level of the electronic device of the low power display mode. For example, the processor 120 may control the memory 130 to store information related to the power consumption level of the electronic device 101 received through the user interface for setting the power consumption level.

Upon execution of an application, the electronic device 101 may obtain color information necessary for displaying content of a GUI related to the application and store the same in the memory 130. The electronic device 101 may set an application able to display a notification object by power consumption level on the basis of the color information necessary for displaying the content of the GUI related to the application stored in the memory 130.

Figure 12:
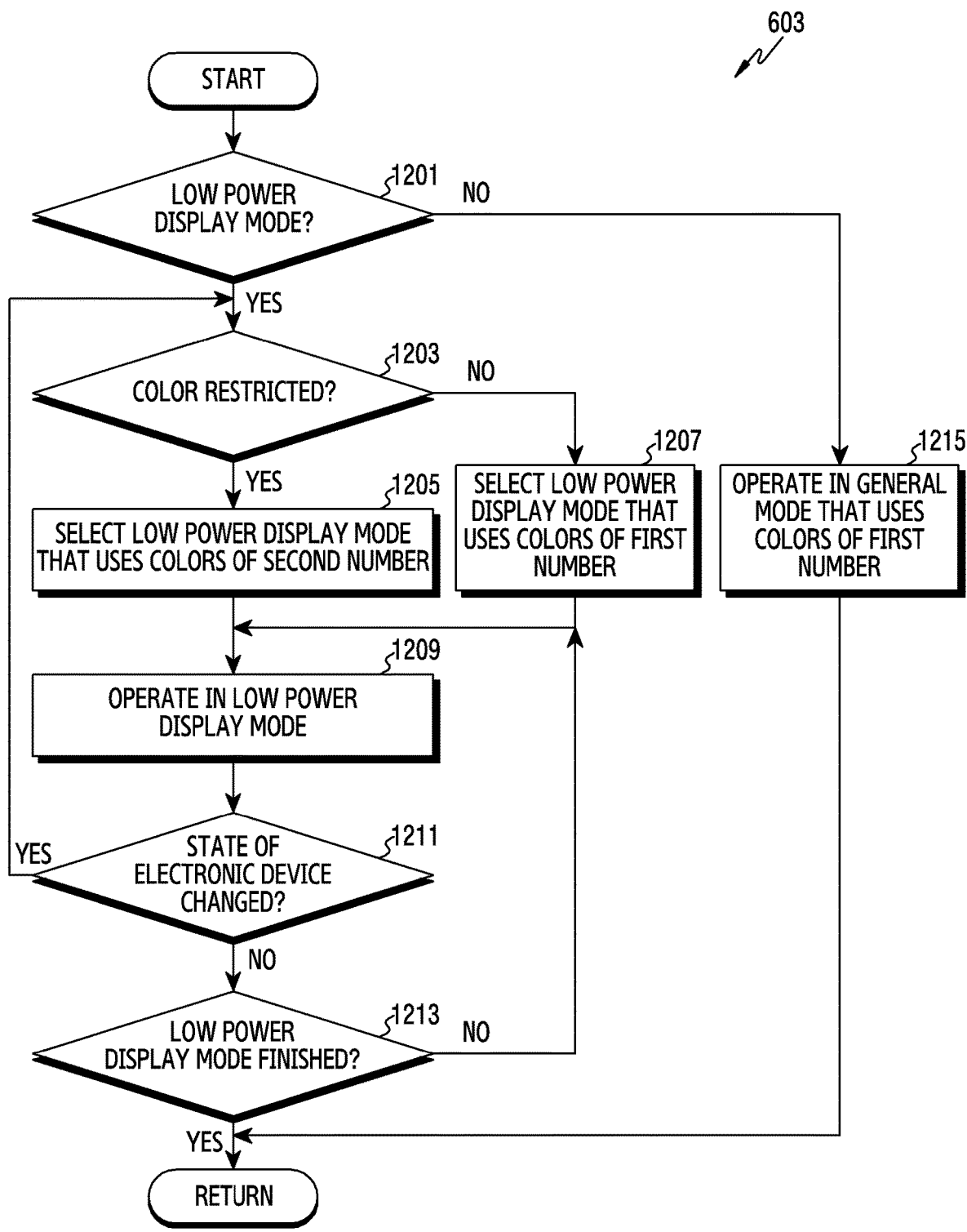
FIG. 12 illustrates a flowchart for selecting a display operation mode on the basis of a state of an electronic device, according to an embodiment.

FIG. 12 illustrates a flowchart for selecting a display operation mode on the basis of a state of an electronic device, according to an embodiment. The flowchart of FIG. 12 may represent the procedure for selecting the display operation mode of the electronic device in step 603 of FIG. 6. The electronic device may include at least part of the electronic device 101 of FIG. 1.

Referring to FIG. 12, in step 1201, the electronic device identifies whether an event for conversion into a low power display mode takes place. For example, in response to the low power display mode being turned on, the electronic device 101 may execute the low power display mode as the processor 120 is converted into a sleep state. Accordingly, the processor 120 may identify whether an event for sleep state conversion for the processor 120 takes place.

In step 1215, in response to the event for conversion into the low power display mode not taking place, the electronic device operates in a first mode. For example, in response to the electronic device 101 operating in the first mode, the processor 120 may control the display device 160 to display a GUI corresponding to the first mode.

In step 1203, in response to the event for conversion into the low power display mode taking place, the electronic device identifies whether a color of a GUI for displaying in the display device is restricted while the electronic device operates in the low power display mode on the basis of state information of the electronic device. For example, the processor 120 may identify whether to restrict the color of the GUI in the low power display mode on the basis of a battery level of the electronic device 101 identified in step 601 of FIG. 6. In response to the battery level of the electronic device 101 being equal to or being less than a given battery amount (reference battery amount), the processor 120 may restrict a color that will be used for displaying the GUI in the low power display mode (i.e, by limiting the restricted color to a second number of colors).

In response to the battery level of the electronic device 101 exceeding the given battery amount (reference battery amount), the processor 120 may set the color that will be used for displaying the GUI in the low power display mode, to a first number of colors, identical to the general mode.

In step 1205, in response to the color of the GUI for displaying in the display device 160 being restricted while the electronic device operates in the low power display mode, the electronic device selects the low power display mode of the electronic device as a low power display mode (second mode) that uses the second number of colors. For example, the processor 120 may set the display operation mode of the electronic device 101 as the second mode.

In step 1207, in response to not restricting the color of the GUI for displaying in the display device 160 while the electronic device operates in the low power display mode, the electronic device selects the low power display mode of the electronic device as a low power display mode (third mode) that uses the first number of colors. For example, the processor 120 may set the display operation mode of the electronic device 101 as the third mode.

In step 1209, the electronic device operates in the low power display mode. For example, in a state where driving of the processor 120 is restricted, the display control module 210 may display a GUI through the display panel 220 by using the first number or second number of colors which are set by the processor 120.

In step 1211, the electronic device identifies whether state information of the electronic device is changed while the electronic device operates in the low power display mode. The electronic device 101 may identify whether an external power supply is connected while the electronic device operates in the low power display mode. For example, the electronic device 101 may identify whether a battery level is decreased an amount equal to or less than a given battery amount (reference battery amount) while the electronic device operates in the low power display mode.

In response to the state information of the electronic device being changed, in step 1203, the electronic device identifies whether a color of a GUI for displaying in the display device 160 is restricted while the electronic device operates in the low power display mode on the basis of the changed state information of the electronic device.

In step 1213, in response to the state information of the electronic device being maintained, the electronic device identifies whether the low power display mode is finished. For example, the electronic device 101 may identify whether an input (e.g., a user input) for conversion into a turn-on state is received.

In response to the low power display mode being maintained, in step 1209, the electronic device maintains the low power display mode.

Figure 13:
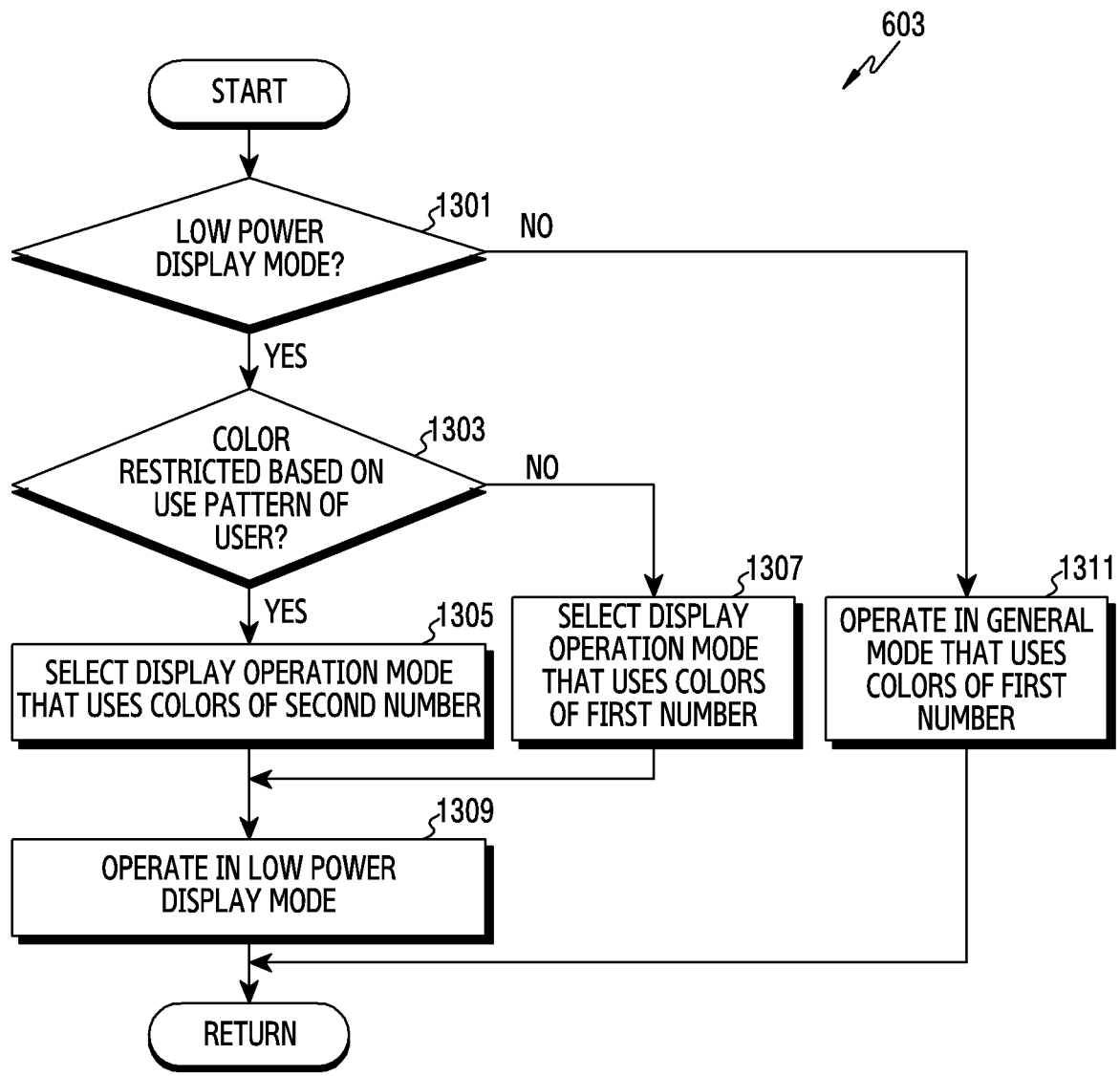
FIG. 13 illustrates a flowchart for selecting a display operation mode on the basis of a use pattern of a user in an electronic device, according to an embodiment.

FIG. 13 illustrates a flowchart for selecting a display operation mode on the basis of a use pattern of a user in an electronic device, according to an embodiment. The flowchart of FIG. 13 may represent the procedure for selecting the display operation mode of the electronic device in step 603 of FIG. 6. In the following description, the electronic device may include at least part of the electronic device 101 of FIG. 1.

Referring to FIG. 13, in step 1301, the electronic device identifies whether an event for conversion into a low power display mode takes place. For example, in response to the electronic device 101 being converted into a sleep state, the processor 120 may identify that the event for conversion into the low power display mode takes place.

In step 1311, in response to the event for conversion into the low power display mode not occurring, the electronic device operates in a first mode. For example, the processor 120 may control the display device 160 to display a GUI related to an application that is being run in the electronic device 101.

In step 1303, in response to the event for conversion into the low power display mode taking place, the electronic device identifies whether a color of a GUI for displaying in the display device is restricted while the electronic device operates in the low power display mode on the basis of the use pattern of the user. For example, the processor 120 may identify an application for providing notification information in the low power display mode. The processor 120 may identify whether to restrict the color of the GUI on the basis of a pattern of identifying a notification of an application for providing notification information in the low power display mode on the basis of a use history of the user. In response to the user of the electronic device 101 deleting a notification within a reference time from a notification generation time point of an application, the processor 120 may identify that a necessity of a notification object related to the application is decreased. In this case, the processor 120 may restrict a color that will be used for displaying the GUI to a second number of colors, in the low power display mode. In response to the user of the electronic device 101 not identifying the notification within the reference time from the notification generation time point of the application, the processor 120 may identify that the notification object related to the application is needed. In this case, the processor 120 may set the color that will be used for displaying the GUI to a first number of colors, in the low power display mode, identical to a general mode.

In step 1305, in response to the color used for displaying the GUI being restricted while the electronic device operates in the low power display mode, the electronic device selects the display operation mode of the electronic device as a second mode. For example, the processor 120 may select a low power display mode restricting the color that may be used for displaying the GUI in the display device 160 to the second number of colors while the electronic device operates in the low power display mode.

In step 1307, in response to not restricting the color of the GUI for displaying in the display device 160 while the electronic device operates in the low power display mode, the electronic device selects the display operation mode of the electronic device as the third mode. For example, the processor 120 may select a low power display mode of setting the color that may be used for displaying the GUI in the display device 160 to a first number of colors while the electronic device operates in the low power display mode, identical to a general mode.

In step 1309, the electronic device operates in the low power display mode. For example, in a state where driving of the processor 120 is restricted, the display control module 210 may display the GUI through the display panel 220 by using the first number or the second number of colors which are set by the processor 120.

In response to restricting a color that may be used for displaying a GUI to a second number of colors in a low power display mode, the electronic device 101 may update a priority for notification of an application on the basis of a color of content related to an application notification. For example, in response to the display operation mode of the electronic device 101 being selected as the second mode, the processor 120 may set a relatively low priority for a notification of an application in which content related to an application notification uses a color other than a reference number of colors. In this case, the occurrence of an application notification event, of which the priority is relatively low set, may be restricted during the low power display mode.

According to various embodiments of the present disclosure, a method for operating in an electronic device may include identifying at least one of a state of the electronic device, the content of a GUI or a use pattern of a user, and selecting one of a first mode, a second mode or a third mode on the basis of the at least one of the state of the electronic device, the content of the GUI or the use pattern of the user, and the first mode may include a mode of displaying a first GUI on the display by using a first number of colors in a state where all pixels included in a touch screen display of the electronic device are turned on, and the second mode may include a mode of displaying a second GUI on the display by using a second number of colors in a state where some of the pixels are turned off, the second number being less than the first number, and the third mode may include a mode of displaying a third GUI on the display by using the first number of colors in a state where some of the pixels are turned off.

The second number may include eight, and the first number may include approximately one hundred and sixty thousand.

Selecting the one mode may include identifying whether the GUI is related to at least one selected application program, and selecting the second mode or the third mode on the basis of at least part of the identifying.

Selecting the one mode may include selecting the second mode in response to the GUI being related to the at least one selected application program, and selecting the third mode in response to the GUI not being related to the at least one selected application program.

The at least one selected application program may include at least one application program which is selected based on a power consumption level of the electronic device among application programs installed in the electronic device.

Selecting the one mode may include selecting the second mode in response to a color necessary for displaying the content of the GUI being included in the colors of the second number of colors, and selecting the third mode in response to the color necessary for displaying the content of the GUI including a color not included in the second number of colors.

Selecting the one mode may include selecting the second mode in response to a battery level of the electronic device being lower than a given battery level, and selecting the third mode in response to the battery level of the electronic device exceeding the given battery level.

Selecting the one mode may include identifying a time point of deletion of a notification event related to at least one application program on the basis of the use pattern of the user, and selecting the second mode or the third mode on the basis of the deletion time point.

According to various embodiments of the present disclosure, a non-transitory computer-readable storage medium for storing one or more programs for identifying at least one of a state of the electronic device, the content of a GUI or a use pattern of a user, and on the basis of at least one of the state of the electronic device, the content of the GUI or the use pattern of the user, selecting one of a first mode of displaying a first GUI on the display by using a first number of colors in a state where all pixels included in a touch screen display of the electronic device are turned on, a second mode of displaying a second GUI on the display by using a second number of colors in a state where some of the pixels are turned off, the second number being less than the first number, or a third mode of displaying a third GUI on the display by using the first number of colors in a state where some of the pixels are turned off.

In the non-transitory computer-readable storage medium, selecting the mode may include identifying whether the GUI is related to at least one selected application program, and selecting the second mode or the third mode on the basis of at least part of the identifying.

In the non-transitory computer-readable storage medium, selecting the one mode may include selecting the second mode in response to the GUI being related to the at least one selected application program, and selecting the third mode in response to the GUI not being related to the at least one selected application program.

In the non-transitory computer-readable storage medium, selecting the one mode may include identifying at least one application program that is selected based on a power consumption level of the electronic device among application programs installed in the electronic device, identifying whether the GUI is related to the at least one selected application program, and selecting the second mode or the third mode on the basis of at least part of identifying whether the GUI is related to the at least one selected application program.

Accordingly, an electronic device according to various embodiments of the present disclosure and an operation method thereof may select any one of a plurality of low power display modes on the basis of at least one of a state (e.g., battery level) of the electronic device, content of a GUI or a use pattern of a user, thereby reducing power consumption through the use of the low power display mode.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
    a display comprising an organic light emitting layer that is formed of a plurality of pixels;
    a wireless communication circuit;
    a processor operatively coupled with the display and the wireless communication circuit; and
    a memory operatively coupled with the processor,
    wherein the memory stores instructions that, upon execution, enable the processor to:
    identify whether an event for conversion into a low power state occurs;
    in response to the event not occurring, select a display operation mode as a first mode of displaying a first graphical user interface (GUI) on the display by using a first number of colors in a state where all the pixels are turned on,
    in response to the event occurring, select the display operation mode as one of a second mode or a third mode based on a power consumption level set by a user input, wherein the second mode comprises displaying a second GUI on the display by using a second number of colors in the low power state where a first number of pixels are turned off, the second number of colors being less than the first number of colors, or the third mode comprises displaying a third GUI on the display by using the first number of colors in the second low power state where a second number of pixels are turned off; and
    display, via the display, the second GUI or the third GUI based on the selected display operation mode during the low power state,
    wherein the first number of pixels and the second number of pixels are differently set.

2. The electronic device of claim 1, wherein the second number of colors comprises eight, and
    the first number of colors comprises approximately one hundred and sixty thousand.

3. The electronic device of claim 1, further comprising instructions that enable the processor to:
    identify whether a GUI is related to at least one selected application program; and
    select the second mode or the third mode on the basis of at least part of the identifying.

4. The electronic device of claim 3, further comprising instructions that enable the processor to select the third mode, in response to the GUI not being related to the at least one selected application program.

5. The electronic device of claim 3, wherein the at least one selected application program comprises at least one application program which is selected based on the power consumption level of the electronic device among application programs installed in the electronic device.

6. The electronic device of claim 1, further comprising instructions that enable the processor to:
    identify a color necessary for displaying content of a GUI; and
    select the third mode in response to the color comprising a color not included in the second number of colors.

7. The electronic device of claim 1, further comprising instructions that enable the processor to:
    identify a battery level of the electronic device on the basis of a state of the electronic device; and
    select the second mode in response to the battery level of the electronic device being lower than a given battery level.

8. The electronic device of claim 1, further comprising instructions that enable the processor to:
    identify a time point of deletion of a notification event related to at least one application program on the basis of a use pattern of the user; and
    select the second mode or the third mode on the basis of the deletion time point.

9. A method for operating an electronic device, the method comprising:
    identifying whether an event for conversion into a low power state occurs;
    in response to the event not occurring, selecting a display operation mode as a first mode; and
    in response to the event occurring, selecting the display operation mode as one of a second mode or a third mode based on a power consumption level set by a user input,
    wherein the first mode comprises displaying a first GUI on a display by using a first number of colors in a state where all pixels comprised in the display of the electronic device are turned on,
    wherein the second mode comprises displaying a second GUI on the display by using a second number of colors in the low power state where a first number of pixels are turned off, the second number of colors being less than the first number of colors, wherein the third mode comprises displaying a third GUI on the display by using the first number of colors in the low power state where a second number of pixels are turned off, and wherein the first number of pixels and the second number of pixels are differently set.

10. The method of claim 9, wherein the second number colors comprises eight, and the first number of colors comprises approximately one hundred and sixty thousand.

11. The method of claim 9, wherein selecting the first mode, the second mode or the third mode comprises:

identifying whether a GUI is related to at least one selected application program; and selecting the second mode or the third mode on the basis of at least part of the identifying.

12. The method of claim 11, wherein selecting the first mode, the second mode or the third mode comprises:

selecting the second mode, in response to the GUI being related to the at least one selected application program; and selecting the third mode, in response to the GUI not being related to the at least one selected application program.

13. The method of claim 11, wherein the at least one selected application program comprises at least one application program which is selected based on the power consumption level of the electronic device among application programs installed in the electronic device.

14. The method of claim 9, wherein selecting the first mode, the second mode or the third mode comprises:

selecting the second mode in response to a color necessary for displaying content of a GUI being comprised in the second number of colors; and selecting the third mode in response to the color necessary for displaying the content of the GUI comprising a color not included in the second number of colors.

15. The method of claim 9, wherein selecting the first mode, the second mode or the third mode comprises:

selecting the second mode in response to a battery level of the electronic device being lower than a given battery level; and selecting the third mode in response to the battery level of the electronic device exceeding the given battery level.

16. The method of claim 9, wherein selecting the first mode, the second mode or the third mode comprises:

identifying a time point of deletion of a notification event related to at least one application program on the basis of a use pattern of the user; and selecting the second mode or the third mode on the basis of the deletion time point.

17. A non-transitory computer-readable storage medium for storing one or more programs for:

identifying whether an event for conversion into a low power state occurs;

in response to the event not occurring, selecting a display operation mode as a first mode of displaying a first GUI on a display by using a first number of colors in a state where all pixels comprised in the display of the electronic device are turned on;

in response to the event occurring, selecting the display operation mode as one of a second mode of displaying a second GUI on the display by using a second number of colors in the low power state where a first number of pixels are turned off, the second number of colors being less than the first number of colors, or a third mode of displaying a third GUI on the display by using the first number of colors in the low power state where a second number of pixels are turned off, based on a power consumption level set by a user input; and displaying the second GUI or the third GUI based on the selected display operation mode during the low power state, wherein the first number of pixels and the second number of pixels are differently set.

18. The non-transitory computer-readable storage medium of claim 17, wherein selecting the first mode, the second mode, or the third mode comprises:

identifying whether a GUI is related to at least one selected application program; and selecting the second mode or the third mode on the basis of at least part of the identifying.

19. The non-transitory computer-readable storage medium of claim 18, wherein selecting the first mode, the second mode, or the third mode comprises:

selecting the second mode, in response to the GUI being related to the at least one selected application program; and selecting the third mode, in response to the GUI not being related to the at least one selected application program.

20. The non-transitory computer-readable storage medium of claim 17, wherein selecting the first mode, the second mode, or the third mode comprises:

identifying at least one application program that is selected based on the power consumption level of the electronic device among application programs installed in the electronic device;

identifying whether the GUI is related to the at least one selected application program; and selecting the second mode or the third mode on the basis of at least part of identifying whether the GUI is related to the at least one selected application program.

* * * * *